United States Patent [19]

Burkhardt et al.

[11] 4,429,620

[45] Feb. 7, 1984

[54] HYDRAULICALLY OPERATED ACTUATOR

[75] Inventors: Joseph A. Burkhardt; Thomas W. Childers, both of New Orleans, La.; Harry R. Hanson, Houston, Tex.; Bobby M. Harkrider, Gretna, La.

[73] Assignee: Exxon Production Research Co., Houston, Tex.

[21] Appl. No.: 287,004

[22] Filed: Jul. 27, 1981

Related U.S. Application Data

[63] Continuation of Ser. No. 13,941, Feb. 22, 1979, abandoned.

[51] Int. Cl.³ .......................................... F15B 13/042
[52] U.S. Cl. .................................... 91/395; 91/401; 92/152; 92/162 R; 251/62; 277/58; 277/113; 277/236
[58] Field of Search ......................... 91/394, 395, 401; 92/152, 162 R; 251/62, 63, 63.5, 63.6, 214; 277/58, 113, 236

[56] References Cited

U.S. PATENT DOCUMENTS

| | | | |
|---|---|---|---|
| 2,911,952 | 11/1959 | Peras | 91/394 |
| 3,047,300 | 7/1962 | Taylor | 277/236 |
| 3,072,104 | 1/1963 | Marsh | 91/394 |
| 3,238,850 | 3/1966 | Desmarchelier | 91/394 |
| 3,257,119 | 6/1966 | Bialkowski | 277/236 |
| 3,507,190 | 4/1970 | Kluczynski et al. | 91/395 |
| 3,654,834 | 4/1972 | Sifri et al. | 91/401 |
| 3,974,910 | 8/1976 | Papai | 91/394 |
| 4,127,168 | 11/1978 | Hanson et al. | 277/236 |

Primary Examiner—George L. Walton
Attorney, Agent, or Firm—John S. Schneider

[57] ABSTRACT

A hydraulically operated actuator employs multiple metal-to-metal static seals to isolate the hydraulic fluid and to isolate the actuator from surrounding contaminating (ambient) fluids. A housing contains at least two linearly spaced apart chambers. A piston reciprocates from a retracted position to an extended position (power stroke) and from the extended position to the retracted position (return stroke) in one of the chambers (hydraulic chamber). The hydraulic chamber is separated by the piston into two sections, one of which contains high pressure hydraulic fluid and the other of which contains low pressure hydraulic fluid. A first static metal seal ring unit is designed to seal first at the completion of the power stroke of the piston to isolate the low pressure hydraulic fluid section from external contaminating fluids which may be at a higher pressure. A second static metal seal ring unit is designed to seal at the completion of the return stroke of the piston also to isolate the low pressure section from external contaminating fluids. Power for the return stroke is primarily supplied by springs, with biasing pressure from the external environment providing a lesser contribution. A third static metal seal ring unit may be employed to obtain a simultaneous seal with the first metal seal ring unit to isolate the high pressure section from the low pressure section at the completion of the power stroke of the piston.

37 Claims, 23 Drawing Figures

HYDRAULICALLY OPERATED ACTUATOR

This is a continuation, of application Ser. No. 013,941, filed Feb. 22, 1979, now abandoned

BACKGROUND OF THE INVENTION

1. Field of the Invention

The present invention concerns hydraulically operated actuators which use multiple metal-to-metal static seals and, more particularly, such actuators employed as external operators for subsea valves.

2. Description of the Prior Art

Conventional elastomer type seals have been used heretofore on hydraulically operated type actuators to prevent contamination of the power fluid in subsea and/or well environments. Those environments are corrosive and degrading to most elastomeric (resilient) materials and, consequently, such seals are of questionable reliability. The metal-to-metal static seals of the present invention have greater reliability than the elastomer seals. The metals (alloys) which form the metallic static seals are much less susceptible to deterioration and failure from chemical attack and high temperatures than elastomer compounds currently being used for actuator seals. Further, the actuator-safety valve design of the present invention is more reliable than known conventional actuator safety valve designs and achieves full through-bore capability required for wire line and pump-down tool work. Also, metal-to-metal seals are not contained in such conventional designs. In addition, conventional downhole safety valves are subject to seal leakage due to transfer of loads through the hydraulic components whereas in the present invention, axial loads in the tubing string do not affect operation of the hydraulic system.

SUMMARY OF THE INVENTION

In accordance with the teachings of the invention, an improved hydraulically operated actuator for use subsea and/or in wells for producing oil and/or gas includes a housing containing at least two linearly spaced apart chambers. In one of the chambers—a hydraulic chamber—a piston reciprocates from a retracted position to an extended position in a power stroke and from the extended position to the retracted position in a return stroke. The piston separates the hydraulic chamber into high and low pressure sections. A first metal seal ring unit effects a seal only at the completion of the power stroke of the piston to isolate the low pressure section from external ambient fluids which may be at a higher pressure. A second metal seal ring unit effects a seal only at the completion of the return stroke of the piston to isolate the low pressure section from such external ambient fluids. The force needed to energize the second metal seal ring unit is supplied by return springs, with pressure from the surrounding (contaminating fluid) environment contributing some biasing force when ambient pressure is higher than the pressure of the power fluid. Means are provided in the housing on opposite sides of the piston for supplying operating or power fluid to and for exhausting fluid from the hydraulic chamber when the piston reciprocates in its power and return strokes. A third metal seal ring unit, which, alternatively, may be a knife-edge type metal-to-metal seal or a resilient type seal, is provided to isolate the high pressure section from the low pressure section of the hydraulic chamber at the completion of the power stroke of the piston. To ensure that the third metal seal ring unit effects a seal after the first seal means effects its seal, deformable travel compensation means is positioned adjacent the first metal seal ring unit. A further feature of the invention is employing the actuator to operate a subsurface safety valve used to control flow of fluids through a well tubing and locating the actuator external of the well tubing. Means are provided to compensate for differences in travel between the piston and a valve operator in opening and maintaining open the valve. The compensating means may be arranged on the linkage between the piston and the valve operator or on the valve operator.

DESCRIPTION OF THE PREFERRED EMBODIMENTS

Referring to FIGS. 1A, 1B, 2A and 2B there is shown a hydraulically operated actuator, generally designated 10, for use in operating valves and the like, particularly in subsea and/or well environments.

The actuator includes a housing 11 having a closed upper end 12 and containing three chambers, upper chamber 13, middle (hydraulic) chamber 14 and lower chamber 15. An upper piston rod 16 reciprocates in chambers 13 and 14 through a bushing 17 formed in a nipple 18 (part of housing 11). The upper end of piston rod 16 contains a wrench backup head 20 and a threaded portion 21 on which is threaded a pre-load nut 22 provided with an interior vertical keyway 23. Threaded portion 21 is provided with an exterior vertical keyway 25. A wedge-shaped key 24 positioned in keyway 23 and keyway 25 prevents rotation of nut 22 on piston rod 16. A return compression spring, designated 26, surrounds piston rod 16 between nut 22 and nipple 18 and includes two coiled springs 26a and 26b separated by a spacer ring 27. Chamber 13 contains hydraulic fluid indicated by numeral 28.

Figures 1A, 1B:
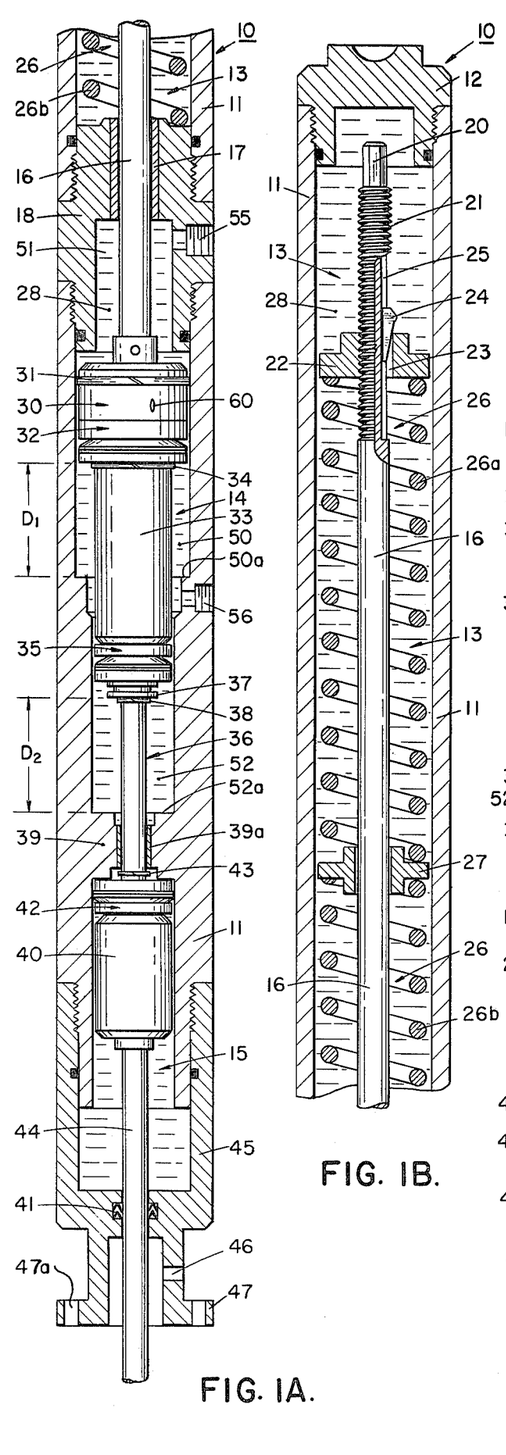
FIGS. 1A and 1B are vertical views of the actuator of the invention, partly in section, illustrating the components thereof at the start of the power stroke of the piston.
Figures 2A, 2B:
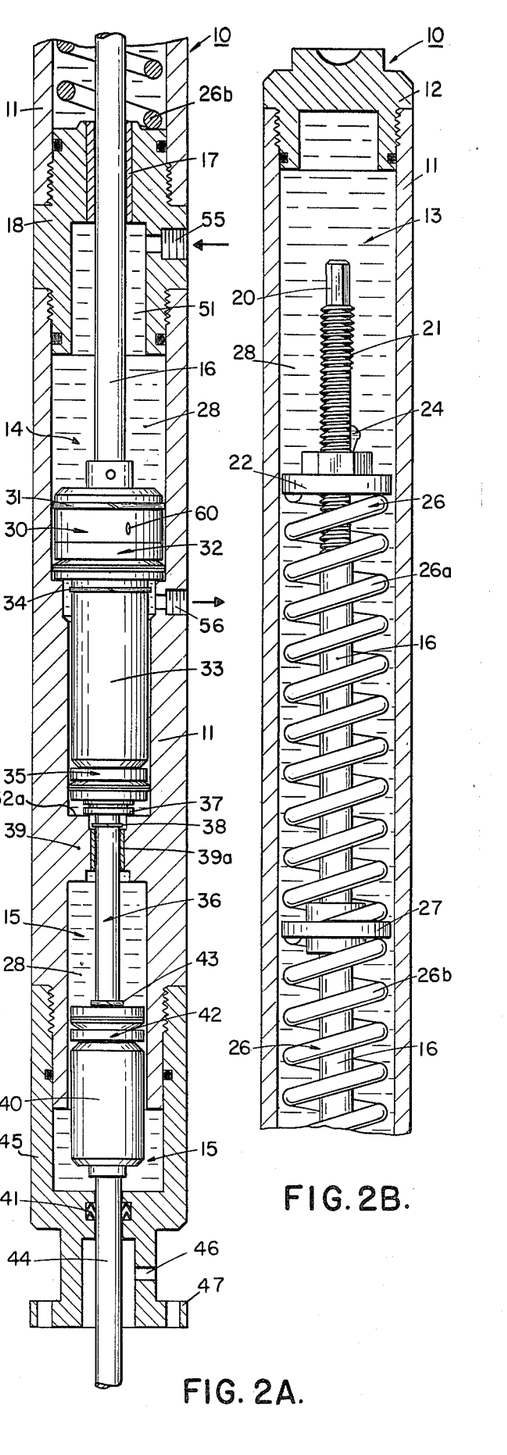
FIGS. 2A and 2B are vertical views of the actuator of the invention, partly in section, illustrating the components thereof at the completion of the power stroke of the piston.

Hydraulic chamber 14 has a large diameter portion 50 in which a piston 30, connected to piston rod 16, reciprocates in power and return strokes and upper and lower smaller diameter portions 51 and 52, respectively. Chamber 14 contains hydraulic power fluid which is introduced from a hydraulic power fluid system, which may be a closed system, into a high pressure section of chamber 14 above piston 30 through an inlet 55 formed in housing 18 and exhausts from a low pressure section of chamber 14 below piston 30 through an exit opening 56. High pressure fluid is introduced into chamber 14 above piston 30 to drive piston 30 downwardly in its power stroke. The position of piston 30 and the other components connected to it are shown in FIGS. 1A and 1B at the start or beginning of the power stroke (or completion of the return stroke) of the piston. The position of piston 30 and the other components connected to it are shown in FIGS. 2A and 2B at the completion of the power stroke of piston 30. Piston 30 is provided with a metal piston ring 31 which serves as a dynamic seal for the power fluid. A lower piston rod 33, slightly less in diameter than the diameter of portion 52, is formed on the lower end of piston 30. Piston rod 33 may be a separate component connected to piston 30 or it may be made integral with piston 30, as shown. A metal seal ring unit 32 surrounds and is retained on piston rod 33 against the underside of piston 30 by a snap ring 34. A connector rod 36 is connected to the lower end of piston rod 33 or it may be an integral part of piston rod 33. A metal seal ring unit 35 is arranged on the upper end of connector rod 36. A crushable keeper ring 37 is also arranged on connector rod 36 below seal ring unit 35. Keeper ring 37 and seal ring unit 35 are maintained on connector rod 36 by a snap ring 38. Connector rod 36 extends through a wall member 39 containing a press fit sleeve bushing 39a and into lower chamber 15. The lower end of connector rod 36 is provided with an enlarged cylindrical portion 40 which is of slightly less diameter than the diameter of chamber 15. A metal seal ring unit 42 is arranged on connector rod 36 above cylindrical portion 40. Seal ring unit 42 is maintained in position by a snap ring 43. An actuator rod 44 is connected to the lower end of connector rod portion 40 and extends through an opening in the lower end 45 of housing 11. A unidirectional resilient seal 41 on that lower end seals off the space between housing 11 and actuator rod 44 in that opening. Seal 41 permits fluid to exit at venting port 46 if the volume change in chamber 15 is significant during energization of the metal seal ring unit 35. A lower flange 47 on housing 11 contains bolt holes 47a for fastening the actuator to equipment to be operated and a venting port 46 is provided in the housing between seal 41 and flange 47.

Figures 3, 4:
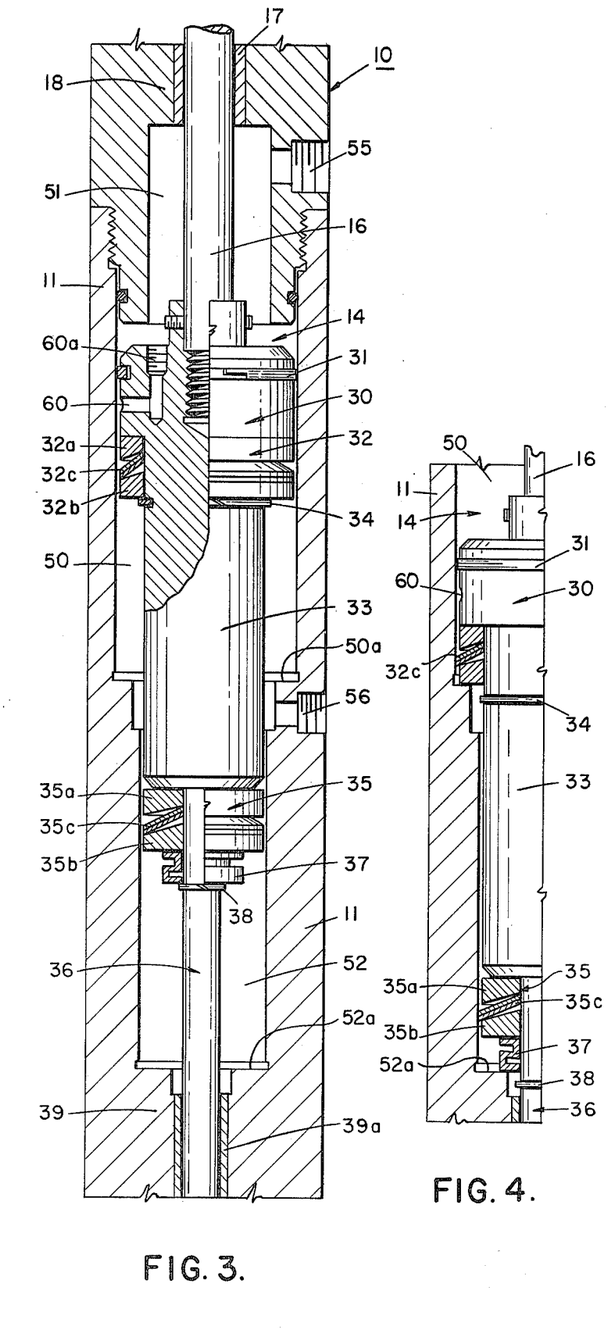
FIG. 3 is a vertical, partly sectional, view illustrating a portion of the actuator apparatus of FIG. 1A in greater detail.
FIG. 4 is a vertical view, partly in section, illustrating another portion of the actuator apparatus of FIG. 1A in greater detail.

Referring now to FIGS. 3, 4, 5 and 6 in which the actuator components are shown in greater detail, a bypass 60 is formed in piston 30 and fluidly communicates chamber 14 above and below piston ring 31. Bypass 60 is provided with a threaded portion 60a for locating a threaded orifice member (not shown) for controlling the rate of upward movement (return stroke) of piston 30. The orifice size is small enough so that sufficient differential pressure can be developed across piston 30 to permit the power stroke of the actuator. Metal seal ring unit 32 includes two chamfered spacer rings 32a and 32b between which are positioned two frusto conical metal seal rings 32c. The seal rings are similar in shape to Bellville springs. Such metal rings, because of their resilient characteristics, can be seated and unseated with a high degree of reliability and yet permit loading forces to be developed. The materials forming the metal rings may suitably be nickel-chromium-molybdenum alloys such as Inconel 625 and Hastelloy C or cobalt-nickel-chromium-molybdenum alloys such as MP 35 N and Elgiloy. The sealing principle is based on changing of the outer and inner diameters of the seal rings as they are flattened under loading. In unloaded position as shown in FIG. 3 the outer edges or peripheries of rings 32c are aligned or nearly aligned with the outer peripheries of spacer rings 32a and 32b. When loaded, as shown in FIG. 4, seal rings 32c are compressed to seal against the bore wall of the portion 50 of chamber 14 and against the outer periphery of piston rod 33.

Metal seal ring unit 35 is similar to metal seal ring unit 32 and is provided with chamfered spacer rings 35a and 35b between which are positioned two frusto conical metal seal rings 35c. As shown in FIG. 3, in unloaded position the outer edges or peripheries of rings 35c are aligned or approximately aligned with the outer peripheries of spacer rings 35a and 35b and when loaded seal rings 35c are compressed to seal against the bore wall of the portion 52 of chamber 14 and against the outer periphery of connector rod 36, as shown in FIG. 4.

As shown in FIG. 1, length $D_1$ is slightly greater than length $D_2$. $D_1$ represents the downward travel (power stroke of piston 30) of seal unit 32 until its lower end engages the lower end wall, shoulder 50a, of chamber 50. Similarly, $D_2$ represents the downward travel of the crushable keeper ring 37 until its lower end engages the lower end wall, 52a, of chamber 52. It is desirable to have both seal ring units 32 and 35 seal off at the same time. As shown in FIG. 4, keeper ring 37 has deformed slightly to ensure precise spacing for seal ring units 32 and 35 when in their sealing positions. Keeper ring 37 deforms, if at all, only on completion of the initial power stroke of piston 30 and, thereafter, retains its plastically deformed shape. Such deformity ensures precise spacing for the metal seal ring units 32 and 35 in the sealing position.

Figure 5:
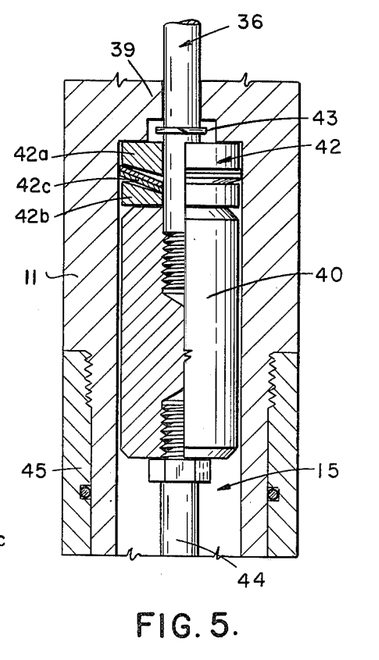
FIG. 5 is an enlarged view of a portion of the apparatus shown in FIG. 1A.
Figure 6:
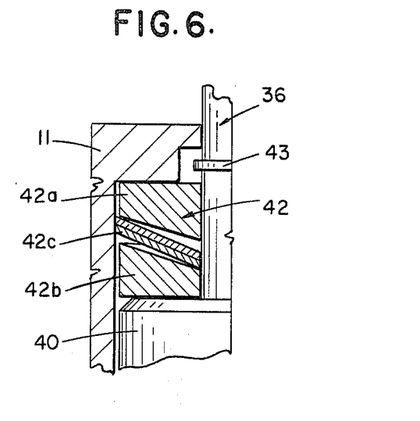
FIG. 6 is an enlarged view of a portion of the apparatus shown in FIG. 5.

In FIGS. 5 and 6 metal seal ring unit 42 is shown in sealing position against the wall of chamber 15 and connector rod 36. Seal ring unit 42 is also similar to seal ring units 32 and 35 in that frusto conical metal seal rings 42c are positioned between chamfered spacer rings 42a and 42b. Metal rings 42c seal on the inner wall of chamber 15 when piston 30 is at the end of its return stroke (or at the start of its power stroke). Seal ring unit 42 is energized in its sealing position by return spring 26 in chamber 13 and ambient fluid pressure that may act on the area of actuator rod 44. At the completion of the power stroke, seal units 32 and 35 are in sealing position as shown in FIG. 4 and seal unit 42 in non-sealing position. As shown, the inwardly directed taper of frusto conicial metal rings 32c, 35c or 42c are in the direction of the movement of the rings which causes release of the seal. The apices of the conically shaped metal rings 32c, 35c or 42c are in the direction of their movement which causes release of the seal. In this manner a more efficient release of the seal rings is achieved and jamming of the seal rings against the chamber wall on which the seal rings seal is prevented.

Figure 7:
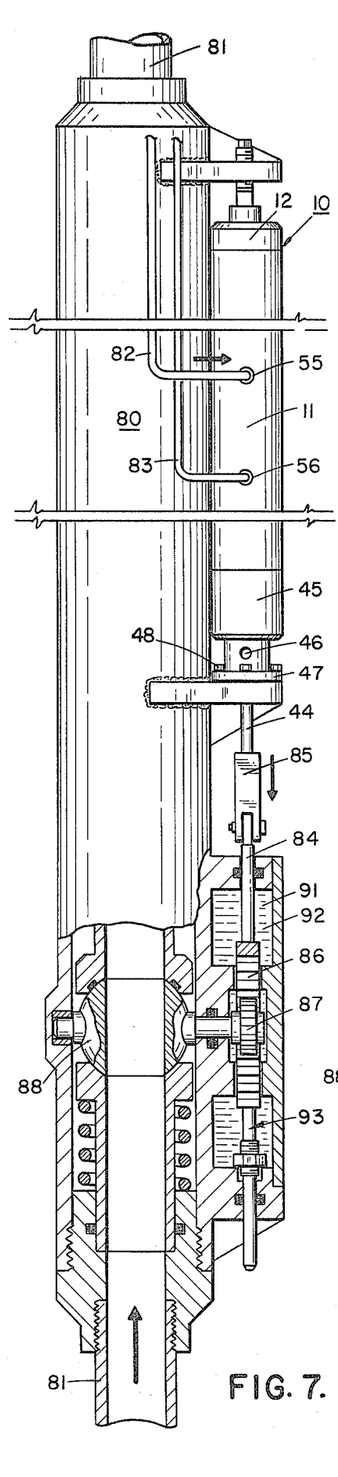
FIG. 7 is a vertical, partly sectional, view of the actuator of the invention connected to a ball type subsurface safety valve used in well operations with the safety valve in its open position.

In FIG. 7, actuator 10 is shown mounted by bolts 48 on a safety valve housing 80 which is connected into a well pipe string 81. A fluid supply conduit 82 connects a closed hydraulic power system fluid supply to opening 55 in actuator 10 and exhaust conduit 83 connects port 56 of actuator 10 into the closed hydraulic system. Actuator rod 44 is connected to a drive rod 84 through linkage 85. Rod 84 is connected to a rack 86 which engages a pinion gear 87 arranged in a chamber 91 of housing 80. Pinion gear 87 is connected to a ball valve 88 which is mounted for rotation in valve housing 80. The rack and pinion arrangement may be suitably lubricated by oil or other lubricant 92 contained in chamber 91. An adjustable stop member, indicated at 93, is connected to the lower end of rack 86 and extends through the lower end of chamber 91 of housing 80. The stop member 93 limits the downward travel of the rack when opening ball valve 88. This permits the ball valve to assume its full open position as shown in FIG. 7. The full open position is desired when producing or circulating fluids and when running downhole tools through the safety valve to perform operations in the well bore below the safety valve.

Figure 8:
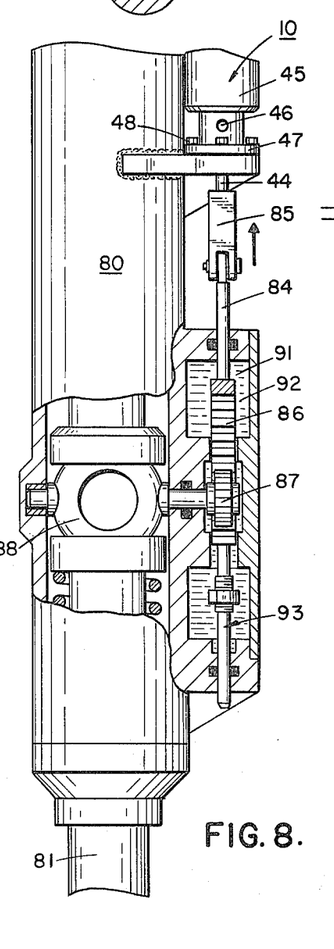
FIG. 8 is a similar view of a portion of the actuator and subsurface safety valve illustrated in FIG. 7 with the safety valve in its closed position.

FIG. 8 shows ball valve 88 in closed position. In that position of the valve, piston 30 of actuator 10 is in its retracted position. Seal ring unit 42 is energized at this time.

Figure 9:
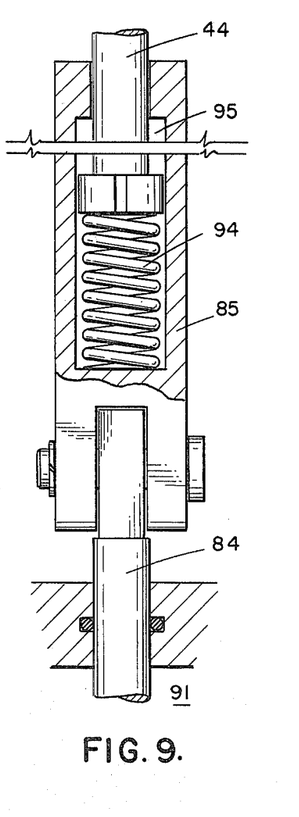
FIG. 9 is a more detailed view of the connection between the actuator and safety valve of FIGS. 7 and 8.

As shown in FIG. 9 a compression spring 94 is positioned in a chamber 95 in linkage 85. Spring 94 functions as a load limiter to allow the piston to stroke fully, and the metal rings to obtain a seal, in the event the valve is stuck in the closed position (pressure trapped below the ball). Spring 94 also permits overtravel of actuator rod 44 so that the ball valve may be moved to its full open position and thereafter allow sealing movement of metal seal ring units 32 and 35. This assures full seating of the metal seals when the valve is in its closed position. Thus, it allows further stroke of rod 44 after rack 86 abuts stop 93.

Figure 10:
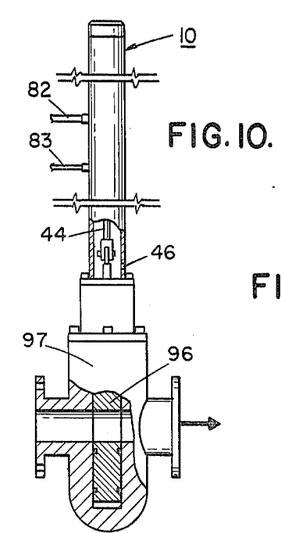
FIG. 10 is a vertical, partly sectional, view of the actuator of the invention connected to a gate valve.

FIG. 10 illustrates the use of actuator 10 with a gate-type valve 96 positioned in a valve housing 97 which may be inserted in a flow line, not shown.

Figure 11:
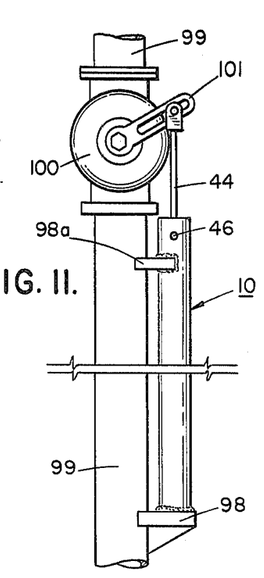
FIG. 11 is a view of the actuator of the invention connected to a ball valve which requires rotation to operate.
Figure 12:
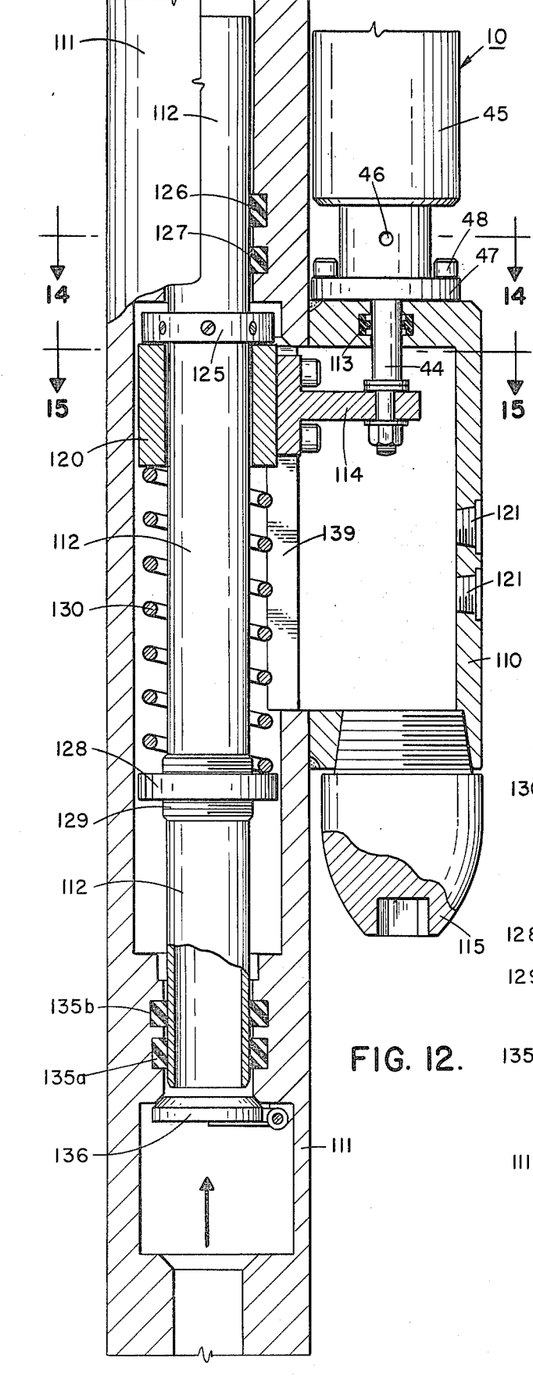
FIGS. 12 and 13 are vertical, partly sectional, views of the actuator of the invention connected to a flapper type safety valve used in well operations in its open and closed positions, respectively.

FIG. 11 illustrates the use of actuator 10, which is mounted as at 98 on a flow line 99, with a rotatable ball valve or stopcock type valve 100. Actuator rod 44 is connected to suitable linkage 101 for causing rotation of the ball valve.

Referring to FIGS. 12 through 16, actuator 10 is connected to a shroud 110 which is welded to (or made integral with) a housing 111 through which a flow tube 112 extends. Actuator rod 44 extends through the upper end of shroud 110 and is sealed by a resilient bidirectional type seal 113 and is bolted to a clevis 114 within shroud 110. The lower end of shroud 110 is closed by a bull plug 115 which permits access to the interior of the shroud so that the clevis can be installed on the clevis ring 120 surrounding flow tube 112. Shroud 110 is also provided with access openings 121 which are shown plugged. Above clevis ring 120 a retainer ring 125 is attached to and surrounds flow tube 112. A wiper ring 126 and a slotted wear ring (or bearing) 127 are positioned on the interior wall of housing 111. An adjustable retainer 128 is arranged on threads 129 on flow tube 112. A load limiter spring 130 is positioned between clevis ring 120 and the adjustable retainer 128. A wiper ring 135a and slotted wear ring (or bearing) 135b are located in the lower end of housing 111. Differential pressure will not be built up across either of the wiper or wear rings, so that frictional drag on the flow tube 112 is minimized. The well bore fluid is isolated from the surrounding environment by resilient seal 113. A spring-biased flapper valve 136 is secured to the lower end of housing 111 to close off the passage through which flow tube 112 extends.

Figure 13:
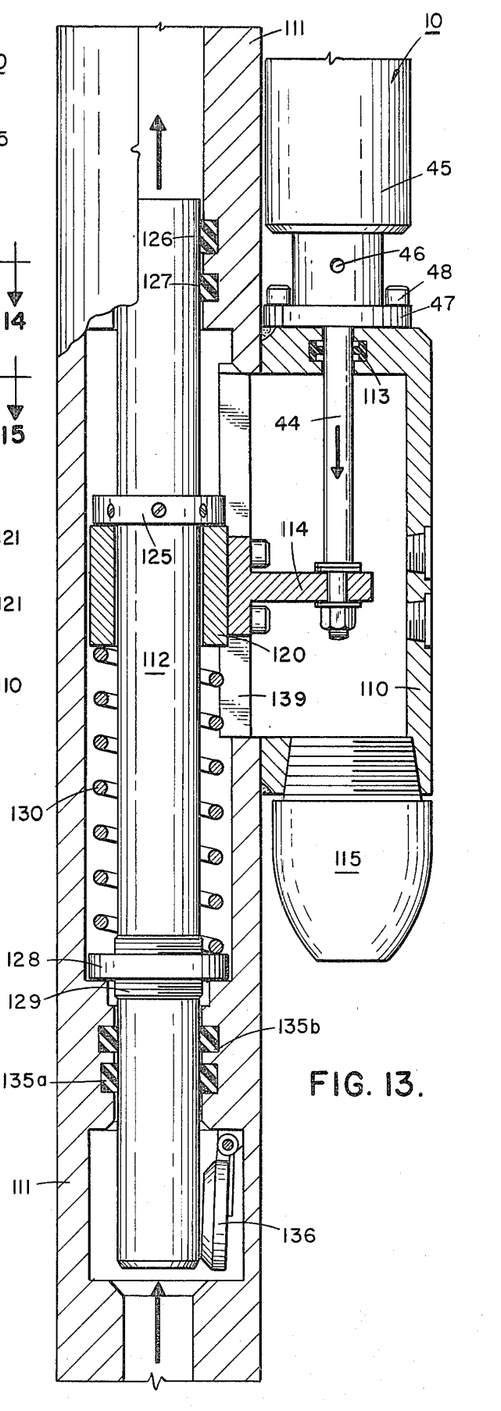
Figure 14:
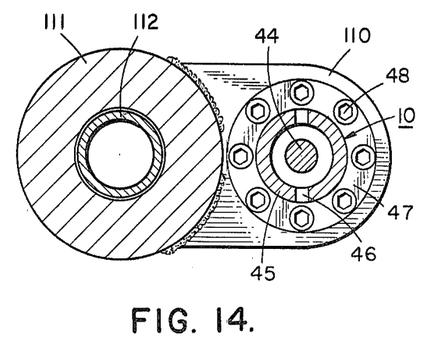
FIG. 14 is a view taken along line 14—14 of FIG. 12.
Figure 15:
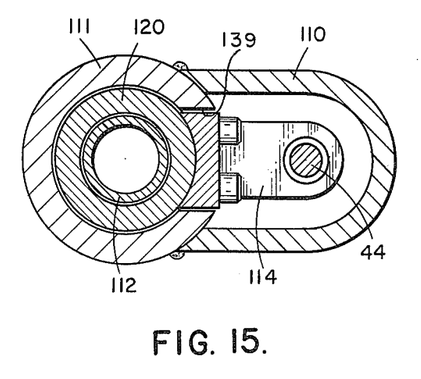
FIG. 15 is a view taken along line 15—15 of FIG. 12.
Figure 16:
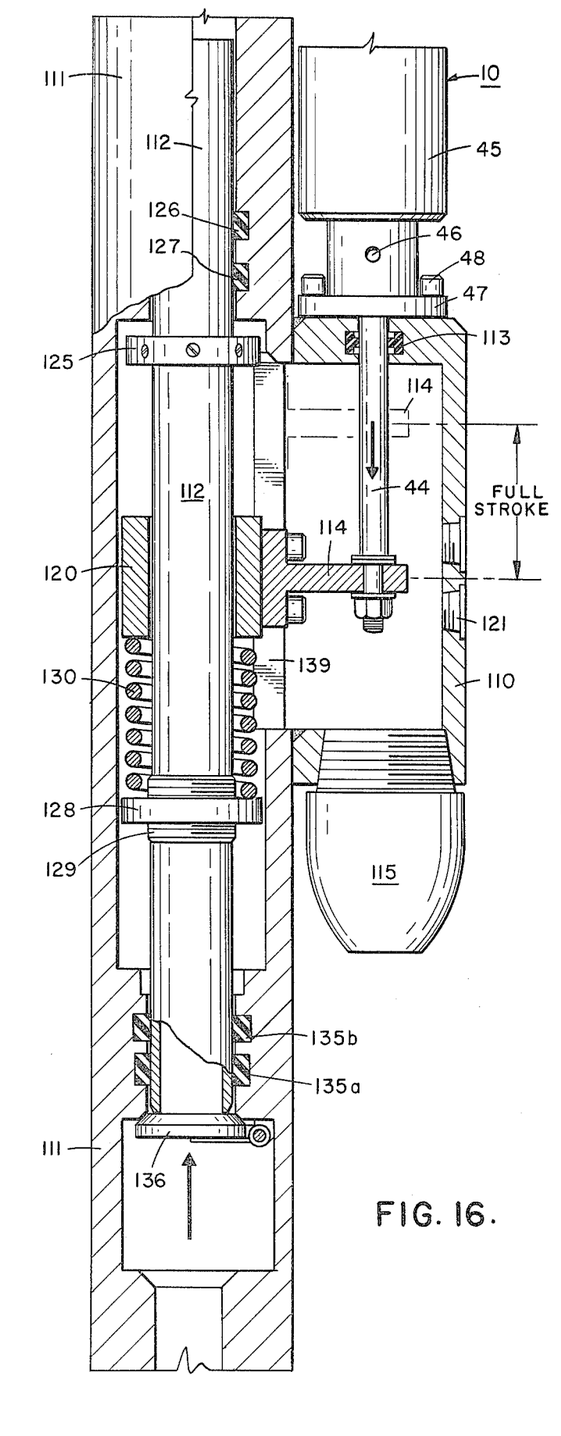
FIG. 16 is another vertical, partly sectional view of the flapper type subsurface safety valve of FIGS. 12 and 13 showing the flapper valve closed and the load limiter spring compressed.

Load limiter spring 130 may be loaded to, for example, about 500 pounds so that under normal operation on opening of flapper valve 136 flow tube 112 is moved down by actuator rod 44 without further compression of spring 130 as illustrated in FIG. 13. However, if flapper valve 136 will not open because of high well pressure below it or for other factors actuator rod 44 will complete its full stroke and compress the load limiter spring 130 as illustrated in FIG. 16. Permitting full stroke of the actuator rod 44 prevents damage to the equipment, as for example, breaking of clevis 114. As seen more clearly in FIG. 15 the sides forming the opening between the valve body and the shroud, indicated at 139, serve as a retainer guide for clevis 114. Bull plug 115 is contoured to streamline the shroud for running into the well pipe. Access openings 121 permit bolting of clevis 114 to clevis ring 120.

Figures 17, 18, 19:
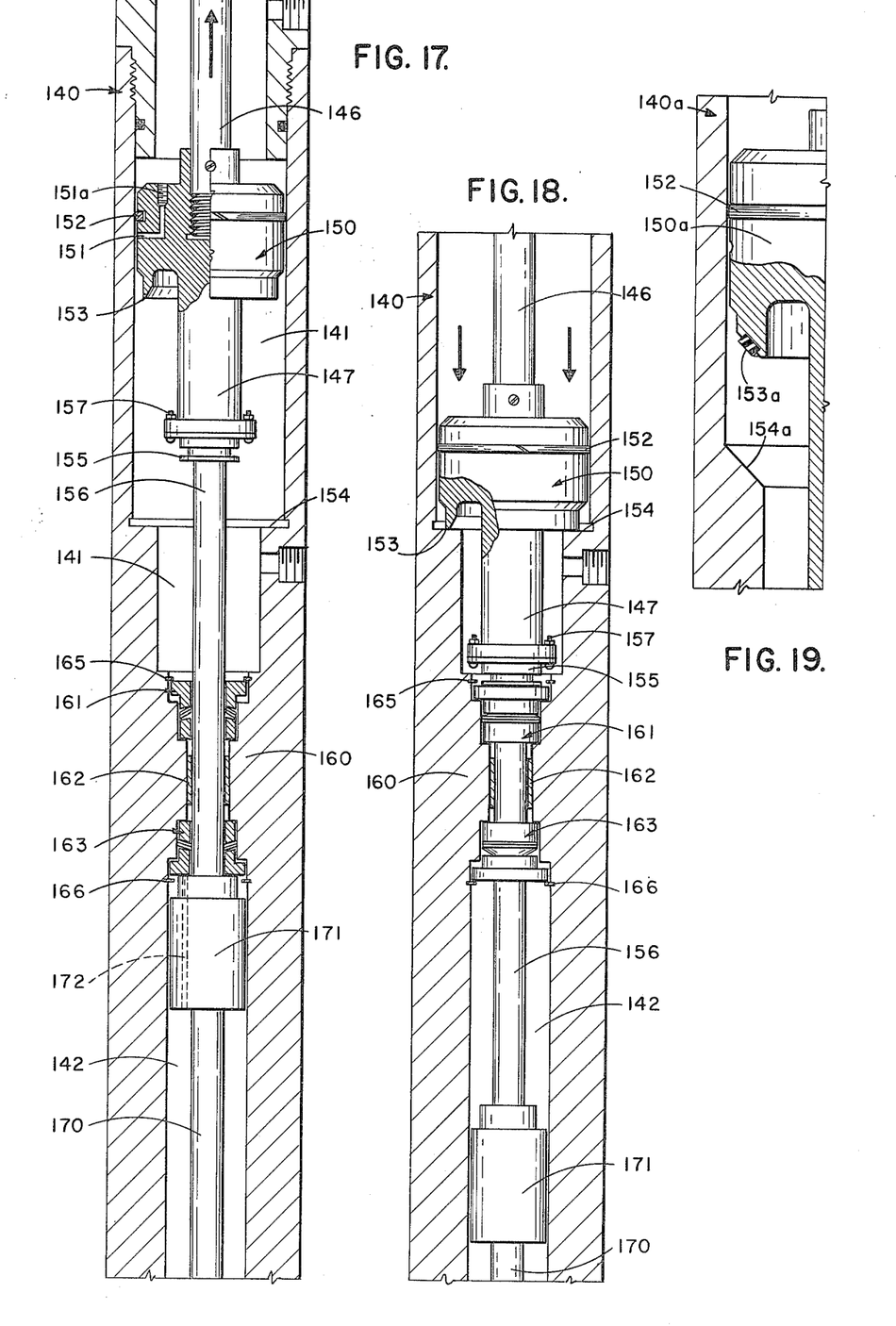
FIGS. 17 and 18 are vertical views, partly in section, of another embodiment of the actuator of the invention illustrating the components thereof at the beginning and at the completion of the power stroke, respectively.
FIG. 19 is a view of still another embodiment of the actuator of the invention illustrating the use of a resilient type static seal for sealing off the piston.

Another embodiment of the invention is illustrated in FIGS. 17 and 18. As shown in those figures an actuator includes a housing 140 having three chambers as in the embodiments of the invention described heretofore, only two of which, a hydraulic chamber 141 and a lower chamber 142, are shown. An upper piston rod 146 reciprocates in chamber 141. Hydraulic chamber 141 contains a piston 150 connected to the lower end of upper piston rod 146 and to a lower piston rod 147. Piston 150 includes a bypass 151 which fluidly communicates chamber 147 above and below a piston ring 152 and is provided with a threaded portion 151a for locating a threaded orifice member (not shown) for controlling the rate of upward movement (return stroke) of piston 150. A crushable keeper ring 115 is arranged about a connector rod 156 which is connected to piston rod 147. Keeper ring 155 is attached to the lower end of rod 147 by bolts 157. Connector rod 156 extends through a wall member 160 which contains a metal seal ring unit 161, a press fit sleeve bushing 162 below metal seal ring unit 161 and a second metal seal ring unit 163 below sleeve 162. Seal ring unit 161 is retained in the recess in wall member 160 by a snap ring 165 and seal ring unit 163 is retained in its recess in wall member 160 by a snap ring 166. The actuator rod 170 is connected to a shoulder coupling 171 through which a fluid by-pass 172 is formed. Piston 150 contains a metallic knife-edge seal 153, which, as shown in FIG. 18, forms a static metal-to-metal seal with a shoulder 154 formed in the inner wall of housing 140. Static seal 153 is an annular member being tapered in cross-section, as shown, and having a deformable reduced contact area or edge. At the end of the power stroke of piston 150 the edge contacts and seals on shoulder seat 154. Under the compressive force of piston 150 the edge yields of plastically deforms to conform to seat 154 to achieve intimate contact and a seal. Piston 150 is preferably constructed of a soft malleable steel such as an annealed American Iron and Steel Institute (AISI) 1015 steel with a hardness in the range of 120 Brinell Hardness Number (BHN). The cylinder and static seat 154 are constructed of a harder steel such as AISI 4130 with a hardness in the range of 235 BHN. Preferably, the seal edge is blunted to prevent failure of the steel seal. The reduced area (edge) of the seal also facilitates cutting through any particles or debris which may be in the fluid in the piston chamber and adhere to seat 154.

As shown in FIG. 17, seal ring unit 161 does not seal on connector rod shaft 156 but metal seal ring unit 163 seals on connector rod shaft 156 in the position of piston 150 at the beginning or start of the power stroke thereof. Seal ring unit 163 isolates chamber 141 from chamber 142 and prevents contaminating fluid in chamber 142 from entering chamber 141. At the completion of the power stroke of the piston, seal 153 seals off on surface 154 to isolate the high and low pressure fluids on each side of piston 150 from each other and seal ring unit 161 seals on connector rod 156. In that position seal ring unit 163 does not seal. However, contaminating fluid is prevented from mixing with the low pressure fluid in chamber 141 by seal ring unit 161.

Referring to FIG. 19, instead of the metal static seal 153-154, a resilient type seal 153a may be arranged on a piston 150a to seal off on a seating surface 154a formed on the inner wall of a housing 140a.

Figure 20:
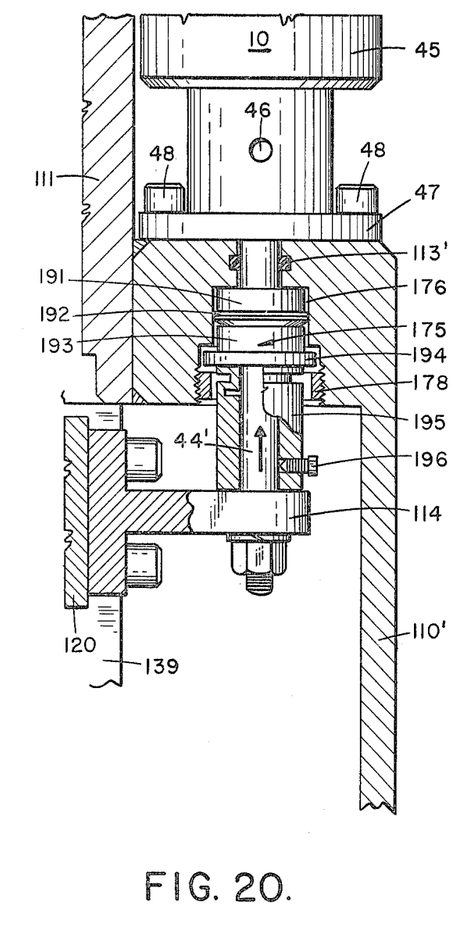
FIG. 20 is a vertical, partly sectional, view of a modified valve shroud.

A modification of the seal for sealing off the actuator rod is illustrated in FIG. 20. Actuator 10 is connected to a shroud 110' which is connected to housing 111 through which a flow tube extends (not shown). An actuator rod 44' extends through the upper end of shroud 110' and is sealed by a resilient seal 113' and by a metal seal ring unit 175 arranged in a recess 176 formed in the upper end of shroud 110'. Metal seal ring unit 175 is similar to the earlier described metal seal ring units and includes an upper spacer ring 191, seal rings 192 and a lower spacer ring 193 having an enlarged diameter portion 194. A deformable keeper sleeve 195 abuts against the enlarged portion 194 of spacer sleeve 193 and is secured to rod 44' by a lock screw 196. An adjustable retainer ring 178 is threaded to the inner wall of recess 176 for engaging the enlarged portion 194 of spacer ring 193 to retain metal seal ring unit 175 and limit downward movement of that unit when rod 44' and keeper sleeve 195 move downward from their uppermost positions, as shown. In that position of rod 44' the valve is closed.

Figure 21:
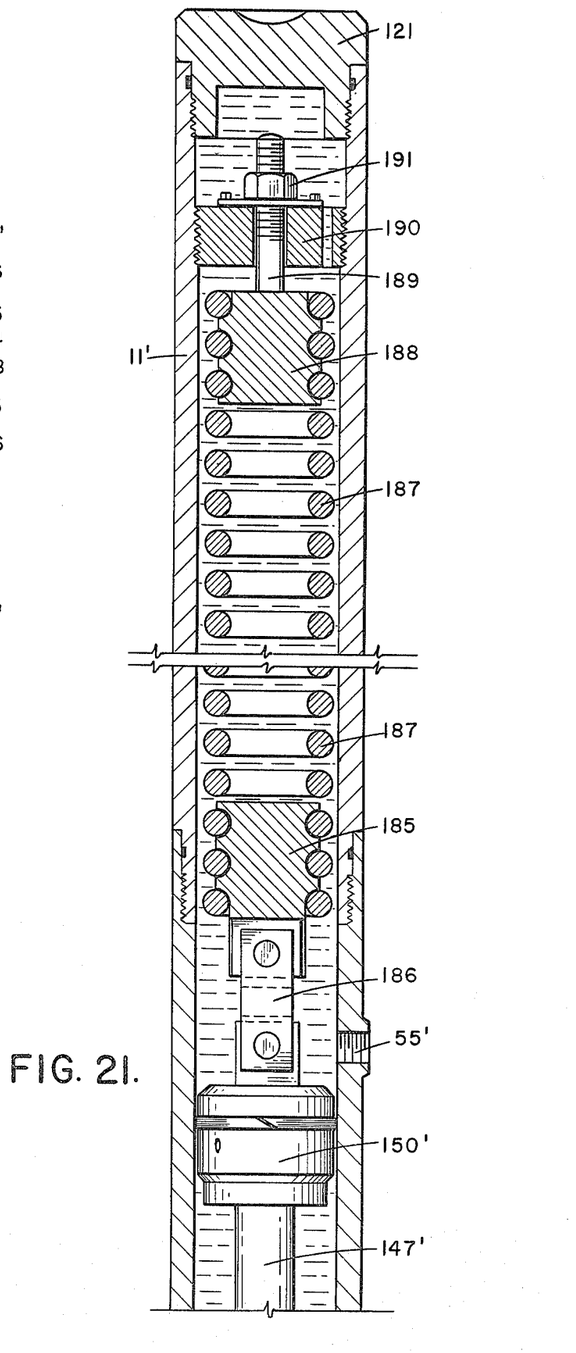
FIG. 21 is a vertical, partly sectional, view of a modified return spring arrangement.

Referring to FIG. 21, there is shown a modified return spring arrangement in which a tension spring is used instead of a compression spring. The lower end of tension spring 187 is connected to piston 150' by a celvis connector 186 and threaded spring plug 185. The upper end of the spring is threaded to a second spring plug 188 provided with an upwardly extending threaded rod 189 which extends through a plate 190 fixed in the bore of the housing 11'. A threaded nut 191 allows tension adjustment of the spring 187.

Figure 22:
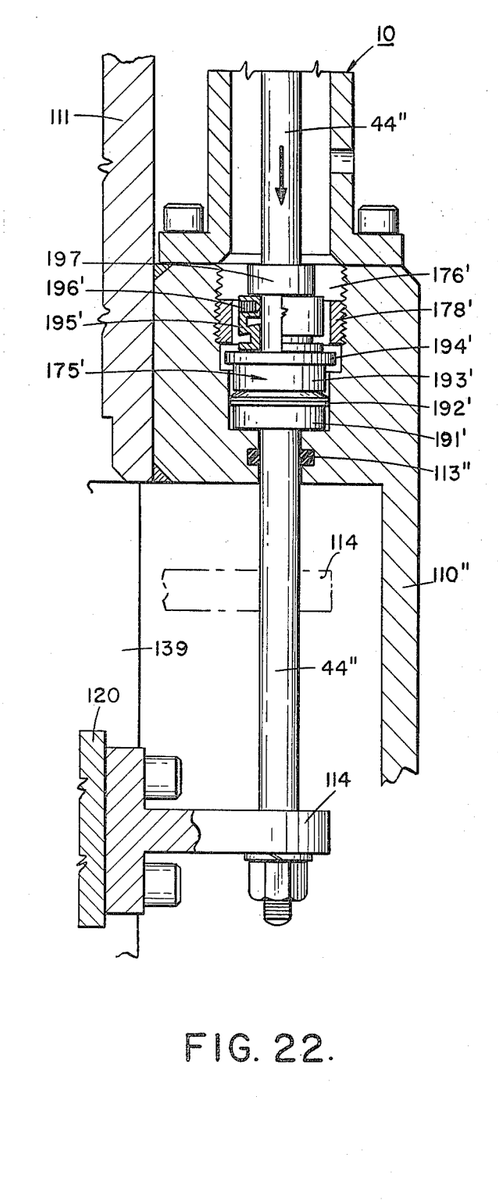
FIG. 22 is a vertical, partly sectional view, of a modified valve shroud.
Figure 23:
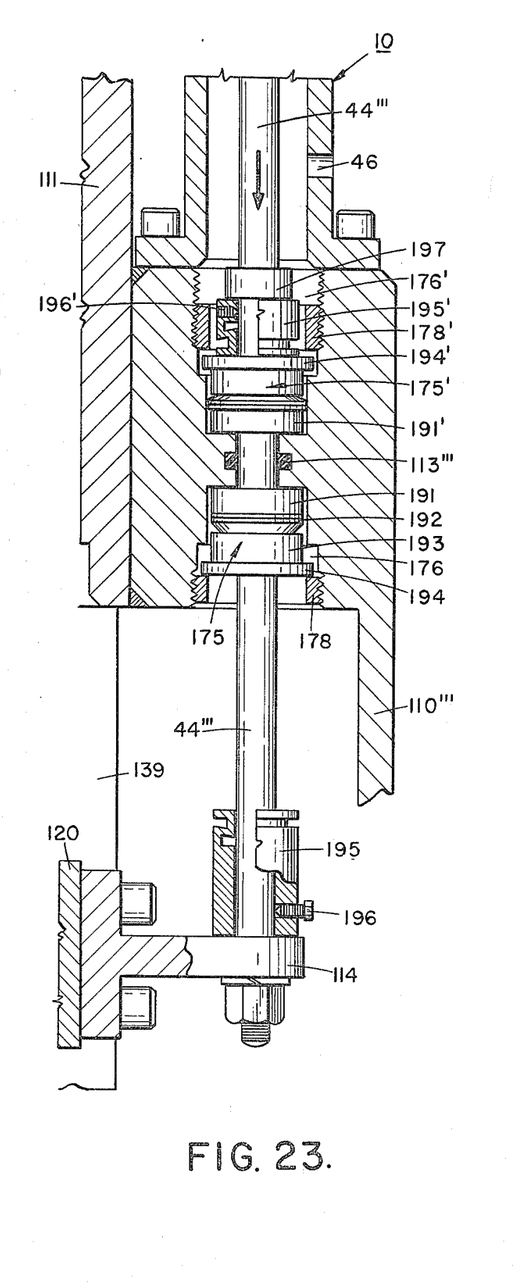
FIG. 23 is a vertical, partly sectional, view of another modification of the valve shroud.

The valve shroud shown in FIG. 22 illustrates a metal sealing unit 175' which seals in the lowermost position of rod 44" in which position the valve is open. The valve shroud of FIG. 23 illustrates the use of two metal seal units, one of which seals in the lowermost position of rod 44''' (valve open) as in FIG. 22 and the other of which seals in the uppermost position of rod 44''' (valve closed) as in FIG. 20. The components of FIG. 22 include a shroud 110", rod 44" connected to clevis 114, a recess 176' formed in shroud 110 which contains an adjustable retainer ring 178', metal ring seal unit 175' which includes a lower spacer ring 191', an upper spacer ring 193' having an enlarged upper portion 194', and seal rings 192' positioned between spacer rings 191' and 193'. A deformable keeper ring 195' is secured to rod 44" by a lock screw 196'. An annular shoulder 197 is formed on rod 44" and abuts against keeper ring 195'. A resilient seal 113" seals about rod 44" in the bore below recess 176'.

The valve shroud 110''' shown in FIG. 23 includes both the seal ring unit 175' of FIG. 22 and the seal ring unit 175 of FIG. 20. In this position of rod 44''' seal ring unit 175 is in the unsealed position, i.e., rod 44''' has completed its down stroke and in that position seal ring unit 175' is in sealing position. The components which are the same as the components of FIGS. 20 and 22 have been given the same designation in FIG. 23. A resilient seal 113''' seals about the rod 44''' in the bore between recesses 176 and 176'.

As mentioned heretofore, seal reliability of the metal-to-metal static seals described above is superior to conventional elastomer or resilient type seals. Therefore, the possibility of the hydraulic power fluid system used to operate the actuator being contaminated by sea water or by production well fluids is minimized. With respect to use of the actuator of the invention as an external operator for a subsurface safety valve, the actuator provides isolation of the hydraulic power fluid system from the production well fluid. In addition, the safety valve design is greatly simplified and provides for full, through-bore capability which is required for wire-line and pump-down tool work. Also, axial loads in the tubing string in which the safety valve is located do not affect operation of the hydraulic system whereas concentric operator type safety valves are subject to seal leakage caused by distortion which results from the transfer of axial loads in the tubing string through the hydraulic components. The metal-to-metal seals are pressure energizing in that an increase is pressure causes a higher contact load at the seal surfaces. The actuator is compatible for use with a flapper valve, ball valve or other type valves operable by an actuator.

Changes and modifications may be made in the illustrative embodiments of the invention shown and/or described herein without departing from the scope of the invention as defined in the appended claims.

We claim:

1. Apparatus comprising:
   a housing having an inner wall and containing at least two linearly spaced-apart chambers;

a piston arranged for reciprocation in one of said chambers in a power stroke and in a return stroke;

reciprocative means connected to said piston for movement therewith and extending from said one chamber into said other chamber;

an annular space formed between said reciprocative means and the inner wall of said housing; and metal seal ring means operable to seal upon compression sealing off fluid communication between said chambers only at the completion of the power stroke and at the completion of the return stroke of said piston, said metal seal ring means comprising two metal seal ring units, one of said seal ring units being resiliently compressed to close off said annular space and seal off fluid communication between said chambers at the completion of the power stroke of said piston and the other of said metal seal ring units being resiliently compressed to close off said annular space and seal off fluid communication between said chambers at the completion of the return stroke of said piston.

2. Apparatus as recited in claim 1 in which said one chamber is formed in two parts; and including seal means for sealing off fluid communication between said parts only at the end of the power stroke of said piston.

3. Apparatus as recited in claim 2 including deformable means arranged on said reciprocative means and capable of deforming to allow simultaneous seals to be obtained by said seal means and by said one metal seal ring unit at the completion of the power stroke of said piston.

4. Apparatus as recited in claims 2 or 3 in which said seal means comprises a third metal seal ring unit.

5. Apparatus as recited in claims 2 or 3 in which said seal means comprises an elastomer type seal.

6. Apparatus as recited in claims 2 or 3 in which said seal means comprises a metal-to-metal knife-edge type seal.

7. Apparatus as recited in claim 1 in which said seal ring units are stationary and are positioned on said inner wall of said housing.

8. Apparatus as recited in claim 1 in which said seal ring units are arranged on said reciprocative means and movable therewith.

9. Apparatus comprising:

a housing, said housing containing linearly spacedapart first, second and third chambers;

said first chamber being formed in two parts, one part having a larger cross-sectional area than the other part;

a piston arranged in said one part to reciprocate from one position to another position in a power stroke and from the other position to said one position in a return stroke;

a first piston rod attached to and movable with said piston;

a first metal seal ring unit being resiliently compressed sealing off fluid communication between said first and second chambers only at the end of the power stroke of said piston;

a connector rod connected to and movable with said piston rod and extending into said second chamber;

a second metal seal ring unit being resiliently compressed sealing off fluid communication between said first and second chambers only at the completion of the return stroke of said piston;

seal means for sealing off fluid communication between said parts of said first chamber only at the end of the power stroke of said piston;

an actuator rod connected to said connector rod;

a second piston rod attached to said piston and extending into said third chamber; and biasing means arranged in said third chamber for urging said piston to said one position thereof.

10. Apparatus as recited in claim 9 in which said seal ring units are stationary and are positioned on an inner wall of said housing.

11. Apparatus as recited in claim 9 in which said seal ring units are arranged on said connector rod and movable therewith.

12. Apparatus as recited in claims 10 or 11 in which said seal means comprises a third metal seal ring unit.

13. Apparatus as recited in claims 10 or 11 in which said seal means comprises an elastomer type seal.

14. Apparatus as recited in claims 10 or 11 in which said seal means comprises a metal-to-metal knife-edge type seal.

15. Apparatus as recited in claim 9 in which said biasing means comprises compression spring means.

16. Apparatus as recited in claim 9 in which said biasing means comprises tension spring means.

17. Apparatus as recited in claim 9 including deformable means arranged on said connector rod and capable of deforming to allow simultaneous seals to be obtained by said seal means and by said first metal seal ring unit at the completion of the power stroke of said piston.

18. Apparatus comprising:

a housing having an inner wall and containing at least two linearly spaced-apart chambers;

a piston arranged in one of said chambers for reciprocation from one position to another position in a power stroke and from the other position to the one position in a return stroke;

a piston rod attached to said piston and movable in said one chamber therewith;

a first metal seal ring unit connected to said piston rod for movement therewith and being resiliently compressed for sealing off fluid communication between said chambers at the completion of the power stroke of said piston;

a connector rod connected to said piston rod and extending into said other chamber;

a second metal seal ring unit connected to said connector rod for movement therewith in said other chamber and being resiliently compressed for sealing off fluid communication between said chambers at the completion of the return stroke of said piston;

an actuator rod connected to said connector rod; and biasing means in said housing for urging said piston to said one position thereof.

19. Apparatus as recited in claim 18 in which said biasing means comprises compression spring means.

20. Apparatus as recited in claim 18 in which said biasing means comprises tension spring means.

21. Apparatus as recited in claim 18 in which said one chamber is formed in two parts; and including seal means being resiliently compressed for sealing off fluid communication between said parts only at the end of the power stroke of said piston.

22. Apparatus as recited in claim 21 in which said metal seal ring units are stationary and are positioned in said inner wall of said housing.

23. Apparatus as recited in claim 21 in which said seal ring units are arranged on said connector rod and movable therewith.

24. Apparatus as recited in claim 21 including deformable means arranged on said connector rod and capable of deforming to allow simultaneous seals to be obtained by said seal means and said first metal seal ring unit at the completion of the power stroke of said piston.

25. Apparatus as recited in claim 21 in which said seal means comprises a third metal seal ring unit.

26. Apparatus as recited in claim 21 in which said seal means comprises an elastomer type seal.

27. Apparatus as recited in claim 21 in which said seal means comprises a metal-to-metal knife-edge type seal.

28. Apparatus comprising:
a housing, said housing containing at least one chamber;
a piston arranged in said chamber for reciprocation from one position to another position in a power stroke and from the other position to the one position in a return stroke;
a piston rod attached to said piston and movable in said chamber therewith;
said chamber being formed in two parts;
seal means being resiliently compressed for sealing off fluid communication between said parts only at the end of the power stroke of said piston;
an annular space between said piston rod and the inner wall of said housing;
a metal seal ring unit operable to seal upon resilient compression sealing off fluid communication only at the completion of the power stroke of said piston to close off said annular space; and
deformable means arranged on said piston rod and capable of deforming to allow simultaneous seals to be obtained by said seal means and by said one metal seal ring unit at the completion of the power stroke of said piston.

29. Apparatus as recited in claim 28 in which said seal means comprises another metal seal ring unit.

30. Apparatus as recited in claim 28 in which seal means comprises as elastomer type seal.

31. Apparatus as recited in claim 28 in which said seal means comprises a metal-to-metal knife-edge type seal.

32. Apparatus comprising:
a housing having an inner wall and containing at least two linearly spaced-apart chambers;
a piston arranged for reciprocation in one of said chambers in a power stroke and in a return stroke;
said chamber being formed in two parts;
seal means being resiliently compressed for sealing off fluid communication between said parts only at the end of the power stroke of said piston;
reciprocative means connected to said piston for movement therewith and extending from said one chamber into said other chamber;
a first annular space formed between said reciprocative means and the inner wall of said housing;
an actuator means connected to said reciprocative means and movable in said other chamber and extending from said housing;
a first metal seal ring unit operable to seal upon resilient compression sealing off fluid communication only at the completion of the power stroke of said piston to close off said first annular space;
a second metal seal ring unit operable to seal upon resilient compression sealing off fluid communication only at the completion of the return stroke of said piston to close off said first annular space;
a second annular space formed between said actuator rod and the inner wall of said housing;
a third metal seal ring unit operable to seal upon resilient compression sealing off fluid communication only at the completion of the return stroke of said piston to close off said second annular space;
first deformable means arranged on said reciprocative means and capable of deforming to allow simultaneous seals to be obtained by said seal means and by said one metal seal ring unit at the completion of the power stroke of said piston; and
second deformable means arranged on said actuator rod and capable of deforming to allow simultaneous seals to be obtained by said second metal seal ring unit and by said third metal seal ring unit at the completion of the return stroke of said piston.

33. Apparatus as recited in claim 32 in which said seal means comprises another metal seal ring unit.

34. Apparatus as recited in claim 32 in which said seal means comprises an elastomer type seal.

35. Apparatus as recited in claim 32 in which said seal means comprises a metal-to-metal knife-edge type seal.

36. Apparatus as recited in claim 32 including a fourth metal seal ring unit operable to seal upon resilient compression sealing off fluid communication only at the completion of the power stroke of said piston to close off said second annular space.

37. Apparatus as recited in claim 32 or 36 including another seal means for sealing off said second annular space.

* * * * *